Figure 1:
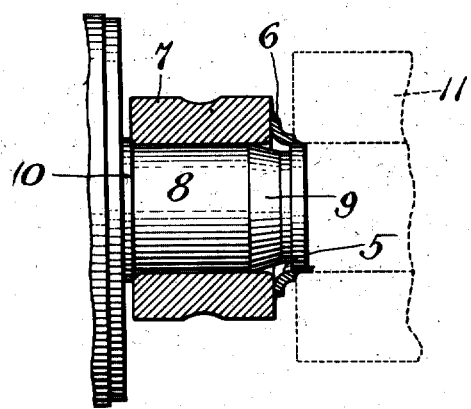

T. L. LEE.
FASTENING DEVICE.
APPLICATION FILED APR. 10, 1916.

1,213,509.

Patented Jan. 23, 1917.

Inventor:
Thomas L. Lee
by his attorney
Farnum F. Dorsey

UNITED STATES PATENT OFFICE.

THOMAS L. LEE, OF ROCHESTER, NEW YORK, ASSIGNOR TO NORTH EAST ELECTRIC COMPANY, OF ROCHESTER, NEW YORK, A CORPORATION OF NEW YORK.

FASTENING DEVICE.

1,213,509.   Specification of Letters Patent.   Patented Jan. 23, 1917.

Application filed April 10, 1916. Serial No. 90,203.

*To all whom it may concern:*

Be it known that I, THOMAS L. LEE, a citizen of the United States, residing at Rochester, in the county of Monroe and State of New York, have invented certain new and useful Improvements in Fastening Devices; and I do hereby declare the following to be a full, clear, and exact description of the invention, such as will enable others skilled in the art to which it appertains to make and use the same.

This invention relates to a fastening device for use in securing an annular member against longitudinal movement upon a shaft.

In fastening an annular member such, for example, as the race of a ball-bearing, upon a shaft, it has heretofore been proposed to employ a deformable sleeve or ring which abuts against the annular member and is forced or sprung into a slot or other recess in the shaft.

The present invention relates to fastening devices of this type, and the object of the invention is to produce a fastening-device which may be produced simply and inexpensively of malleable sheet-metal, and which shall be so formed that it may be forced into a groove or recess in a shaft, and may at the same time be more or less upset against the annular member which is to be fixed upon the shaft. By provision for such upsetting of the fastening-device, a close fitting together of the parts may be secured regardless of the slight variations in the dimensions of the parts due to the ordinary methods of manufacture, so that in every case the annular member may be fixed rigidly against axial movement upon the shaft.

To the foregoing end I employ, in the present invention, a fastening-device of annular form, consisting of bendable or malleable metal, this fastening-device comprising, integrally, a sleeve or neck-portion which is adapted to be slipped over the end of the shaft and then forced into a groove or recess therein, and a flange which extends outwardly from one end of the sleeve and is adapted to abut against the annular member mounted on the shaft. This flange is united originally with the sleeve by a curve, rather than a sharp angle, so that in setting the fastening-device in place the axial pressure to which it is subjected causes the flange to be upset and spread against the surface of the annular member, whereby the fastening-device yields sufficiently to permit the other extremity of the sleeve to be engaged with the groove or recess in the shaft, while at the same time preserving a perfectly tight fit and engagement between the fastening-device and the annular member, so as to insure against any looseness of the parts after the fastening-device has been fixed in place.

Figure 2:
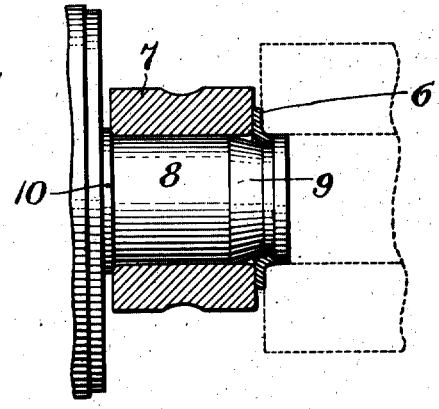
Figure 3:
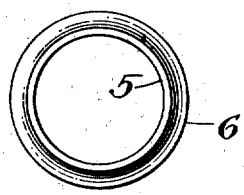

In the accompanying drawings Figures 1 and 2 are axial sections of a fastening-device embodying the present invention, together with a grooved shaft and an annular member in connection with which the fastening-device is used, Fig. 1 showing the parts in position prior to the operation of fixing the fastening-device in place, and Fig. 2 showing the parts in the positions assumed after that operation. Fig. 3 is an end-elevation of the fastening-device alone.

The invention is illustrated as embodied in a fastening-device having a general form similar to that of an eyelet. This device may be conveniently made by stamping, from soft steel or other malleable sheet-metal, and comprises a short sleeve or neck 5, and an outwardly extending flange 6, these parts being integrally united in a smooth curve, as shown particularly in Fig. 1.

The illustrated fastening-device is used in connection with a shaft 8 which is provided, near one end, with an annular groove 9. Upon the shaft is mounted an annular member 7 such, for example, as the inner race of an annular ball-bearing. This member is seated, at its left-hand end, against a shoulder 10 on the shaft, and the fastening device is employed to retain the race 7 against the shoulder.

The sleeve-portion 5 of the fastening-device is of sufficient diameter to slip easily over the shaft, while the entire length of the device is somewhat greater, normally, than the space between the right-hand end of the race 7 and the shoulder formed by the right-hand surface of the groove 9. This relation of the parts is shown in Fig. 1.

The fastening-device is set in place by means of a die or tool 11 in the form of a sleeve, adapted to pass over the end of the shaft and having a rounded surface which engages the right-hand edge of the sleeve-portion 5. When this tool is moved from right to left with sufficient pressure, the parts assume the position shown in Fig. 2. The sleeve-portion 5 of the fastening-device is moved toward the left until its edge is coincident with the shoulder of the slot 9, whereupon the beveled or rounded surface of the die forces the sleeve-portion inwardly, thus bending and compresing it into the slot. The fastening-device accommodates itself to the first part of this longitudinal compressing movement through the yielding of the flange 6, which is flattened or upset and also somewhat spread against the surface of the annular member 7, so that in the final condition of the parts the flange is flatter and wider, and the neck-portion shorter and of less diameter, than in the original form of the fastening-device.

It will be apparent that the yielding action above described of the fastening-device is such as to accommodate the device to the variations in the dimensions of the parts which may occur in the ordinary processes of manufacture, while the device affords a firm and tight fastening when set in the position of Fig. 2.

While the neck or sleeve-portion of the fastening-device has been illustrated as of a minimum length, it will be apparent that it may be made of any convenient length according to circumstances, the essential point being that the fastener be, in its original form, slightly longer in an axial direction than the space into which it is to be compressed.

I claim:

The combination, with a recessed shaft and a member mounted thereon, of an integral annular fastening-device of malleable metal, comprising a sleeve normally of greater diameter than the shaft, and a flange normally curving outwardly from one end of the sleeve; the other end of the sleeve being compressed into the recess in said shaft, and the flange being upset against said member mounted on the shaft.

THOMAS L. LEE.